US009545596B2

United States Patent
Hu

(10) Patent No.: US 9,545,596 B2
(45) Date of Patent: Jan. 17, 2017

(54) GAS SEPARATION BY VAPORIZED COMPOUND

(76) Inventor: Liang Hu, Lexington, KY (US)

( * ) Notice: Subject to any disclaimer, the term of this patent is extended or adjusted under 35 U.S.C. 154(b) by 1249 days.

(21) Appl. No.: 13/525,633

(22) Filed: Jun. 18, 2012

(65) Prior Publication Data

US 2012/0321538 A1  Dec. 20, 2012

Related U.S. Application Data

(60) Provisional application No. 61/498,153, filed on Jun. 17, 2011.

(51) Int. Cl.
*B01D 53/76* (2006.01)
*B01D 53/14* (2006.01)
*B01D 53/96* (2006.01)

(52) U.S. Cl.
CPC ....... *B01D 53/1462* (2013.01); *B01D 53/1481* (2013.01); *B01D 53/1425* (2013.01); *B01D 2251/304* (2013.01); *B01D 2251/306* (2013.01); *B01D 2252/103* (2013.01); *B01D 2252/204* (2013.01); *B01D 2252/205* (2013.01); *B01D 2252/2023* (2013.01); *B01D 2252/2056* (2013.01); *B01D 2252/30* (2013.01); *B01D 2252/504* (2013.01)

(58) Field of Classification Search
None
See application file for complete search history.

(56) References Cited

U.S. PATENT DOCUMENTS

2009/0199713 A1\* 8/2009 Asprion ............ B01D 53/1475
95/236

\* cited by examiner

*Primary Examiner* — Daniel Berns
(74) *Attorney, Agent, or Firm* — Novick, Kim & Lee, PLLC; Allen Xue

(57) ABSTRACT

An improved process for deacidizing a gaseous mixture with reduced overall energy costs is described. The process involves contacting the gaseous mixture with at least one of a vaporizing compound, a vaporized compound, a vaporizing solution of compound and a vaporized solution of compound, and forming a liquid or solid reaction product that can be easily separated from the gaseous mixture.

16 Claims, No Drawings

GAS SEPARATION BY VAPORIZED COMPOUND

CROSS-REFERENCE TO RELATED APPLICATIONS

This application claims the benefit under 35 U.S.C. §119 (e) of U.S. Provisional Application No. 61/498,153, filed Jun. 17, 2011, the entire disclosure of which is hereby incorporated herein by reference.

FIELD OF INVENTION

The present invention relates to a process for deacidizing a gaseous mixture. More particularly, the present invention relates to a method for the separation of an acid gas from a gaseous mixture using a vaporized absorbent.

BACKGROUND OF THE INVENTION

Deacidization is required before a raw natural gas or any other gaseous mixture that contains significant amounts of acid gas, such as hydrogen sulfide ($H_2S$), carbon dioxide ($CO_2$), $NO_x$, $SO_x$, or similar contaminants, can be utilized. The deacidization process reduces the acid gas impurity in the gaseous mixture to acceptable levels. This is commonly done with an amine gas treatment process. Amine gas treatment processes are common in various types of industrial settings, such as refineries, natural gas processing plants, and petrochemical plants. Amine gas treatment processes include the processes utilizing aqueous solutions of amines to remove acid gas, such as $H_2S$ and $CO_2$, from natural gases.

BRIEF SUMMARY OF THE INVENTION

In one general aspect, embodiments of the present invention relate to a method for deacidizing a gaseous mixture comprising an acid gas. The method comprises:
contacting the gaseous mixture with at least one of a vaporizing compound, a vaporized compound, a vaporizing solution of compound and a vaporized solution of compound;
allowing the at least one of the vaporizing compound, the vaporized compound, the vaporizing solution of compound and the vaporized solution of compound to react with the acid gas to form a reaction product; and
allowing the reaction product to liquefy and/or solidify to thus separate from the gaseous mixture.

In one embodiment, the method of the present invention further comprises regenerating the separated reaction product to obtain the acid gas and the compound. Preferably, the regenerated compound is recycled for use in another cycle of deacidizing the gaseous mixture.

Other aspects, features and advantages of the invention will be apparent from the following disclosure, including the detailed description of the invention and its preferred embodiments and the appended claims.

DETAILED DESCRIPTION OF THE INVENTION

Unless defined otherwise, all technical and scientific terms used herein have the same meaning as commonly understood to one of ordinary skill in the art to which this invention pertains. Otherwise, certain terms used herein have the meanings as set in the specification. All patents, published patent applications and publications cited herein are incorporated by reference as if set forth fully herein. It must be noted that as used herein and in the appended claims, the singular forms "a," "an," and "the" include plural reference unless the context clearly dictates otherwise.

Embodiments of the present invention relate to a method for deacidizing a gaseous mixture comprising an acid gas. The method comprises:
contacting the gaseous mixture with at least one of a vaporizing compound, a vaporized compound, a vaporizing solution of compound and a vaporized solution of compound;
allowing the at least one of the vaporizing compound, the vaporized compound, the vaporizing solution of compound and the vaporized solution of compound to react with the acid gas to form a reaction product; and
allowing the reaction product to liquefy and/or solidify to thus separate from the gaseous mixture.

The acid gas that can be removed from the gas mixture using a method according to an embodiment of the present invention includes, but is not limited to, one or more selected from the group consisting of carbon dioxide ($CO_2$), sulfur dioxide ($SO_2$), sulfur trioxide ($SO_3$), hydrogen sulfide ($H_2S$), carbon oxysulfide (COS), carbon disulfide ($CS_2$), mercaptans (RSH), nitric oxide (NO), nitric dioxide ($NO_2$), fluorides, HCl, HF and a combination thereof In one embodiment, the deacidization process according to embodiments of the present invention is used to remove an impurity acid gas from a gaseous mixture, in which case the impurity acid gas can be disposed of. In another embodiment, the deacidization process according to embodiments of the present invention is used to collect an acid gas of interest from a gaseous mixture.

Compounds suitable for the present invention include, but are not limited to, any compound suitable for the absorption of an acid gas according to the process of embodiments of the present invention. In a preferred embodiment, the compound is an amine or a mixture of amines, such as one or more selected from the group consisting of amine; alkanolamines (e.g., monoethanolamine, diethanolamine), triethanolamine, ethanolamines, isopropanolamines, ethyleneamines, alkyl alkanolamines, methyldiethanolamine, piperidine, piperazine, dibutylamine, diisopropylamine, and a combination thereof.

The amine can be a pure amine. The amine can also be dissolved in a solvent comprising one or more compounds selected from the group consisting of alcohols, glycols, alkanes, unsaturated hydrocarbon, ethers, esters, aldehydes, ketones, glycol ethers, alkylene carbonates, dialkyl carbonates, sulfolane, ionic liquids, polymers and water.

In a preferred embodiment, the solvent is water.

In another embodiment of the present invention, the compound and/or solution of compound is an aqueous or organic solution comprising one or more salts, such as those selected from the group consisting of alkaline compounds, alkaline salts, ammonium compounds, ammonium salts, alkanolamine compounds, alkanolamine salts, alkaline-earth compound, alkaline-earth compound salts, amino acids, amino acid salts and derivatives thereof.

In one embodiment of the present invention, the compound and/or solution of compound is vaporized before its contact with the gaseous mixture.

In another embodiment of the present invention, the compound and/or solution of compound is vaporized upon or after its contact with the gaseous mixture.

The compound and/or solution of compound can be vaporized by heating, lowering the pressure, spraying or any other methods for vaporization in view of the present disclosure.

In one embodiment of the present invention, the reaction product is liquefied or solidified by physical or chemical interactions between the acid gas and the vaporized absorbent, by cooling, by increasing the pressure or by any other methods for condensation or solidification.

In one embodiment of the present invention, the reaction product is liquefied or solidified under a condition in which the compound and/or solution of compound remains in the vapor state.

In another embodiment of the present invention, the reaction product is liquefied or solidified under a condition in which at least some of the compound and/or solution of compound is also liquefied or solidified.

In one embodiment of the present invention, contacting the gaseous mixture with the compound and/or a solution of compound in vapor state forms a reaction product in vapor state, which is subsequently transformed into a liquid or solid state.

In another embodiment of the present invention, contacting the gaseous mixture with the compound and/or solution of compound in vapor state directly forms a reaction product in liquid or solid state.

In an embodiment, the method of the present invention further comprises regenerating the reaction product to obtain an acid gas and a compound. The separated reaction product is routed to a regeneration unit, where the reaction product is treated to produce or regenerate the compound used for deacidizing and the acid gas. The regeneration process according to embodiments of the present invention can be accomplished by regeneration methods known to those skilled in the art in view of the present disclosure. Exemplary regeneration methods include, but are not limited to, thermal decomposition, gas stripping, steam stripping, distillation, treatment through a membrane contractor, pervaporization, pressure differential treatment, microwave, electric and magnetic wave, and a combination thereof.

The regenerated acid gas is collected or disposed of depending on the purpose of the user. The regenerated compound is recycled for use in another cycle of deacidizing the gaseous mixture.

The following examples illustrate the invention but are in no way intended to limit the scope of the present invention.

Example 1

Process I

A gas mixture contacts and mixes with a vaporized and/or vaporizing a compound or solution of compound, such as an amine from a pure amine or an amine solution, in a high temperature zone (Section I). The gas stream containing the gas mixture and the vaporized and/or vaporizing amine then flows into a lower temperature zone (Section II) where the reaction products of the amine and one or more acid gases, such as CO2, in the gas mixture are separated out from the gas stream by condensation and/or solidification. The liquid and/or solid form of the reaction products are separated by conventional means in view of the present disclosure. The remaining gas mixture is thus deacidized. The reaction products of amine and $CO_2$, in the form of liquid and/or solid, can be regenerated using methods known in the art in view of the present disclosure.

Alternatively, after the mixing and contacting, the gas stream containing the gas mixture and the vaporized and/or vaporizing amine remains in the same chamber, but the temperature of the chamber is lowered to allow the reaction products to separate out from the gas stream by condensation and/or solidification.

Example 2A

Process IIA

A gas mixture contacts and mixes with a compound or solution of compound, such as an amine from a pure amine or an amine solution, in a pressurized chamber. The mixture of the gas and a pure amine or an amine solution is then injected into a second chamber having a lower pressure. The sudden reduction in the pressure vaporizes the amine, and decreases the temperature of the mixture of the gas and amine, and the reaction products of the amine and one or more acid gases, such as CO2, in the gas mixture, are then separated out from the gas stream by condensation and/or solidification. The liquid and/or solid form of the reaction products are separated by conventional means in view of the present disclosure. The remaining gas mixture is thus deacidized. The reaction products of amine and $CO_2$, in the form of liquid and/or solid, can be regenerated using methods known in the art in view of the present disclosure.

The lower pressure chamber can be a simple empty container, such as a container with cooling system. It can also be a cyclone, a cyclone with a cooling system, and/or any other device known to those skilled in the art in view of the present disclosure.

Alternatively, after the mixing and contacting, the mixture of the gas and absorbent remains in the same chamber, but the pressure of the chamber is lowered to allow the reaction products to separate out from the gas stream by condensation and/or solidification.

Example 2B

Process IIB

A gas mixture from a pressurized chamber is injected into a second chamber having a lower pressure. At an area near the injection nozzle, which can be in the pressurized chamber or the lower pressure chamber, the gas mixture contacts and mixes with a compound or solution of compound, such as, an amine or amine solution, and vaporizes the amine or amine solution. The sudden reduction in the pressure decreases the temperature of the mixture of the gas and amine, and the reaction products of the amine and one or more acid gases, such as CO2, in the gas mixture, are then separated out from the gas stream by condensation and/or solidification. The liquid and/or solid form of the reaction products are separated by conventional means in view of the present disclosure. The remaining gas mixture is thus deacidized. The reaction products of amine and $CO_2$, in the form of liquid and/or solid, can be regenerated using methods known in the art in view of the present disclosure.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for deacidizing a gaseous mixture comprising an acid gas, comprising:
   vaporizing a compound suitable for adsorbing the acid gas, wherein the compound is in an aqueous solution, an organic solution, or in a liquid form of the compound;
   reacting the vaporized compound with the acid gas in the gaseous mixture to form a reaction product in a gas stream; and
   condensing or solidifying the reaction product from the gas stream; and
   collecting the condensed or solidified reaction product.

2. The method of claim 1, further comprising regenerating the collected reaction product to obtain the acid gas and a regenerated compound.

3. The method of claim 2, further comprising recycling the regenerated compound for use in another cycle of deacidizing a gaseous mixture.

4. The method of claim 1, wherein the acid gas is selected from the group consisting of carbon dioxide ($CO_2$), sulfur dioxide ($SO_2$), sulfur trioxide ($SO_3$), hydrogen sulfide ($H_2S$), carbon oxysulfide (COS), carbon disulfide ($CS_2$), mercaptans (RSH), nitric oxide (NO), nitric dioxide ($NO_2$), fluorides, HCl, HF and a combination thereof.

5. The method of claim 1, wherein the compound is an amine selected from the group consisting of amine, monoethanolamine, diethanolamine, triethanolamine, ethanolamines, isopropanolamines, ethyleneamines, alkyl alkanolamines, methyldiethanolamine, piperidine, piperazine, dibutylamine, diisopropylamine, and a combination thereof.

6. The method of claim 5, wherein the organic solution comprises a solvent selected from the group consisting of alcohols, glycols, alkanes, unsaturated hydrocarbon, ethers, esters, aldehydes, ketones, glycol ethers, alkylene carbonates, dialkyl carbonates, sulfolane, ionic liquids, and polymers.

7. The method of claim 1, wherein the aqueous or the organic solution comprises one or more members selected from the group consisting of alkaline compounds, alkaline salts, ammonium compounds, ammonium salts, alkanolamine compounds, alkanolamine salts, alkaline compounds, alkaline-earth salts, amino acids, amino acid salts, and derivatives thereof.

8. The method of claim 1, wherein the aqueous or the organic solution comprises one or more basic compounds.

9. The method of claim 8, wherein the basic compound is sodium hydroxide, potassium hydroxide, or an amino acid salt.

10. The method of claim 1, wherein the step of vaporizing the compound is accomplished by heating, microwaving, lowering a pressure of, or spraying the aqueous solution, the organic solution, or the liquid form of the compound.

11. The method of claim 1, wherein the reaction product is condensed or solidified under a condition wherein the unreacted compound remains in the gas stream.

12. The method of claim 1, wherein the reaction product is condensed or solidified under a condition wherein at least a portion of the unreacted compound is also condensed or solidified.

13. The method of claim 1, wherein the reaction product is condensed or solidified by physical or chemical interactions between the acid gas and the compound, by cooling, or by increasing a pressure of the gas stream.

14. The method of claim 1, wherein the step of vaporizing the compound comprises introducing the compound into a pressurized chamber, and injecting the compound from the pressurized chamber to a second chamber having a lower pressure.

15. The method of claim 1, wherein the gaseous mixture and the compound are mixed under at least one of a higher temperature and a higher pressure, and the reaction product is condensed or solidified under at least one of a lower temperature and a lower pressure.

16. The method of claim 1,
    wherein the step of vaporizing the compound comprises injecting the gaseous mixture from a higher pressure chamber to a lower pressure chamber having a lower pressure, wherein the compound is present in the lower pressure chamber.

* * * * *